(12) United States Patent
Dai et al.

(10) Patent No.: US 11,451,262 B1
(45) Date of Patent: Sep. 20, 2022

(54) SPREAD SPECTRUM CLOCK CONVERTER

(71) Applicant: Credo Technology Group Limited, Grand Cayman (KY)

(72) Inventors: Yifei Dai, Shanghai (CN); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 17/213,105

(22) Filed: Mar. 25, 2021

(30) Foreign Application Priority Data

Mar. 5, 2021 (CN) .......................... 202110245221.5

(51) Int. Cl.
*H04B 1/7183* (2011.01)
*H04L 7/033* (2006.01)

(52) U.S. Cl.
CPC .......... *H04B 1/7183* (2013.01); *H04L 7/0331* (2013.01)

(58) Field of Classification Search
CPC ............................ H04B 1/7183; H04L 7/0331
See application file for complete search history.

(56) References Cited

U.S. PATENT DOCUMENTS

| | | | |
|---|---|---|---|
| 7,049,937 B1 | 5/2006 | Zweig | |
| 7,401,985 B2 | 7/2008 | Aronson et al. | |
| 8,488,729 B1 | 7/2013 | Mendel et al. | |
| 91,064,570 | 8/2015 | Masood | |
| 9,230,416 B2 | 1/2016 | Ward | |
| 9,322,704 B1 | 4/2016 | Neveux | |
| 9,337,993 B1 | 5/2016 | Lugthart et al. | |
| 9,385,859 B2 | 7/2016 | Kuan et al. | |
| 9,647,859 B2 | 5/2017 | Ghiasi | |
| 10,212,260 B2 | 2/2019 | Sun | |
| 2003/0174788 A1 | 9/2003 | Li | |
| 2004/0228396 A1* | 11/2004 | Wood, Jr. .............. | H04L 7/0079 375/220 |

(Continued)

FOREIGN PATENT DOCUMENTS

| | | |
|---|---|---|
| CN | 1770660 A | 5/2006 |
| CN | 105814816 A | 7/2016 |

(Continued)

OTHER PUBLICATIONS

Intel—FPGA Automatic Test Equipment—Intel FPGA.

(Continued)

*Primary Examiner* — Dac V Ha
(74) *Attorney, Agent, or Firm* — Ramey LLP; Daniel J. Krueger

(57) ABSTRACT

An illustrative spread spectrum clocking (SSC) converter includes: a deserializer to receive a data stream with an unmodulated clock; a memory coupled to the deserializer to buffer the data stream; and a serializer coupled to the memory to retransmit the data stream with a spread spectrum clock. One illustrative conversion method, which may be implemented on a monolithic integrated circuit device, includes: receiving a data stream from an external transmitter in an unmodulated clock domain; storing the data stream in a buffer; and retransmitting the data stream with a spread spectrum clock. Such converters and methods may be employed in an illustrative system having: a test module to generate test data streams and to analyze result data streams for verifying operation of one or more devices under test in a spread spectrum clock domain as the test module operates in an unmodulated clock domain.

17 Claims, 4 Drawing Sheets

(56) References Cited

U.S. PATENT DOCUMENTS

| | | | |
|---|---|---|---|
| 2007/0237464 A1 | 10/2007 | Aronson | |
| 2008/0114563 A1* | 5/2008 | Kappauf | G01R 31/319 702/124 |
| 2009/0086753 A1 | 4/2009 | Lund et al. | |
| 2010/0329325 A1 | 12/2010 | Mobin et al. | |
| 2011/0068836 A1* | 3/2011 | Wang | H03L 7/0814 327/141 |
| 2012/0093199 A1* | 4/2012 | Liu | H03K 3/84 375/141 |
| 2012/0189086 A1* | 7/2012 | Cai | H04B 15/04 327/356 |
| 2013/0013749 A1 | 1/2013 | Kane, Jr. et al. | |
| 2013/0073749 A1 | 3/2013 | Tremblay et al. | |
| 2013/0343400 A1 | 12/2013 | Lusted et al. | |
| 2014/0086264 A1 | 3/2014 | Lusted et al. | |
| 2014/0146833 A1 | 5/2014 | Lusted | |
| 2014/0241411 A1 | 8/2014 | Ghiasi | |
| 2015/0003505 A1 | 1/2015 | Lusted et al. | |
| 2015/0334186 A1 | 11/2015 | Chen | |
| 2016/0080101 A1 | 3/2016 | Naeini et al. | |
| 2016/0134394 A1 | 5/2016 | Tiruvur et al. | |
| 2016/0197434 A1 | 7/2016 | Lett | |
| 2016/0323164 A1 | 11/2016 | Cao | |
| 2016/0337114 A1 | 11/2016 | Baden et al. | |
| 2016/0337183 A1 | 11/2016 | Cornett et al. | |
| 2017/0245226 A1 | 8/2017 | Chow | |
| 2017/0324657 A1 | 11/2017 | Zhong | |
| 2018/0041332 A1 | 2/2018 | Yang | |
| 2018/0227149 A1 | 8/2018 | Johnson | |
| 2018/0241579 A1 | 8/2018 | Lin | |
| 2019/0386851 A1 | 12/2019 | Dai et al. | |
| 2020/0280329 A1 | 9/2020 | Lam et al. | |
| 2020/0280458 A1 | 9/2020 | Lam et al. | |
| 2021/0313993 A1* | 10/2021 | Bai | H04L 7/005 |

FOREIGN PATENT DOCUMENTS

| | | | |
|---|---|---|---|
| CN | 106411322 A | | 2/2017 |
| CN | 108737024 A | | 11/2018 |
| CN | 109075992 A | | 12/2018 |
| CN | 109286416 A | | 1/2019 |
| CN | 111641090 A | | 9/2020 |

OTHER PUBLICATIONS

Supplemental Notice of Allowability, dated Jan. 14, 2019, U.S. Appl. No. 15/654,446, "Serdes Architecture With a Hidden Backchannel Protocol," filed Jul. 19, 2017, 8 pages.

PCT International Search Report and Written Opinion, dated Sep. 28, 2018, Appl. No. PCT/US2018/013361, "Serdes Systems and Methods Having an Indirect Backchannel," filed Jan. 11, 2018, 18 pages.

International Preliminary Report on Patentability dated Sep. 10, 2019 for PCT/CN2017/075961.

Notice of Allowability dated Jun. 8, 2018 for U.S. Appl. No. 15/487,045.

Non-Final Office Action dated Jan. 24, 2018 in U.S. Appl. No. 15/487,045.

Physical Coding Sublayer (PCS) for 64B/66B, Type 50GBASE-R, Feb. 3, 2017.

Physical Medium Attachment (PMA) Sublayer.

Physical Medium Dependent (PMD) Sublayer and Baseband Medium, Type 50GBASE-CR, 100GBASE-CR2, and 200GBASE-CR4, Feb. 3, 2017.

Reed-Solomon Forward Error Correction (RS-FEC) Sublayer for 50GBASE-R PHYs.

Information Technology—Open Systems Interconnection—Basic Reference Model: The Basic Model, 1994.

Reed-Solomon Forward Error Correction (RS-FEC) Sublayer for 100GBASE-R PHYs.

Notice of Allowance dated Sep. 19, 2018 in U.S. Appl. No. 15/654,446.

Chinese Office Action dated Jan. 15, 2020 for Application No. 201810796112.0.

Chinese Notice of First Office Action dated Aug. 27, 2020 for CN Application No. 201810333105.7.

Chinese Notice of Grant dated Jun. 30, 2020 for Chinese Application No. 201810796112.0.

Notice of International Preliminary Report of Patentability dated Jul. 23, 2020 for International Application No. PCT/US2018/013361.

Notice of Allowance dated Oct. 15, 2020 for U.S. Appl. No. 16/698,935.

Supplemental Notice of Allowance dated Nov. 6, 2020 for U.S. Appl. No. 16/698,935.

Rumer, B. "Fighting Jitter in Fibre-Channel Designs." Electronic Engineering Times, (Feb. 1, 2001). Retrieved Aug. 13, 2019, from https://www.eetimes.com/document.asp?doc_id=1277249.

IEEE P802.3cd/D1.2, Feb. 3, 2017 (Amendment of IEEE Std 802.3-2015 as amended) IEEE Draft Standard for Ethernet Amendment: Media Access Control Parameters for 50 GB/s, 100 GB/s and 200 GB/s Operation. The Institute of Electrical and Electronics Engineers, Inc., 2017; S.I.: IEEE.

* cited by examiner

SPREAD SPECTRUM CLOCK CONVERTER

TECHNICAL FIELD

The present disclosure relates, in general to integrated circuit interfaces and, more particularly, to serializer-deserializer circuitry and methods for interfacing between a fixed clock domain such as may be used by field programmable gate arrays and a modulated clock domain such as may be used by systems with spread spectrum clocking.

BACKGROUND

Network communication standards continue to evolve, employing ever-higher signaling rates. For example, the USB4 standard employs 20 GHz signaling rate and the PCIE5 standard employs a 32 GHz signaling rate. Unfortunately, the higher signaling rates tend to increase electromagnetic emission levels, making it more difficult for electronics manufacturers to meet regulatory limits on electromagnetic interference (EMI). To combat this issue, both the USB4 and PCIE5 standards provide for the use of spread spectrum clocking (SSC), a technique in which the clock signal frequency is modulated in a systematic fashion to distribute emissions over a wider frequency range and thereby attenuate any emission peaks within that range. Certain types of compliance testers may employ SSC to comply with regulatory limits.

Compliance testers may be employed during the electronic device design process to determine whether device prototypes satisfy their system level requirements, and if not, to characterize whatever fault(s) may exist in the prototype design. To further expedite the design process, field programmable gate arrays (FPGAs) may be employed to implement at least some of the early prototypes. For example, the register-transfer level (RTL) code or other hardware description language (HDL) representation may be processed into an FPGA configuration, which is then used to program an FPGA device. The FPGA device then emulates the behavior of the design prototype.

While FPGA devices are extremely adaptable (and hence a popular basis of many automated test equipment architectures), there are limits. Though some of the more advanced FPGA devices are now equipped with serializer-deserializer (SerDes) modules capable of 25 GHz signaling rates, they cannot operate at that signaling rate when SSC is employed. Currently, the highest rate that FPGA devices support with SSC parameters required by the new standards is approximately 6 GHz.

SUMMARY

Accordingly, there are disclosed herein novel SSC converter devices and methods enabling continued use of spread spectrum clocking (SSC) by compliance testers when testing FPGA-based prototypes, as well as continued use of automated test equipment (ATE) with FPGA-based architectures. One illustrative converter includes: a deserializer to receive a data stream with an unmodulated clock; a memory coupled to the deserializer to buffer the data stream; and a serializer coupled to the memory to retransmit the data stream with a spread spectrum clock. One illustrative conversion method, which may be implemented on a monolithic integrated circuit device, includes: receiving a data stream from an external transmitter in an unmodulated clock domain; storing the data stream in a buffer; and retransmitting the data stream with a spread spectrum clock. Such converters and methods may be employed in an illustrative system having: a test module to generate test data streams and to analyze result data streams for verifying operation of one or more devices under test in a spread spectrum clock domain, the test module operating in an unmodulated clock domain; and a converter coupled to the test module to retime the test data streams with a spread spectrum clock and to retime the result data streams with an unmodulated clock. Another illustrative system includes a compliance tester operating with a spread spectrum clock, a device under test that uses an unmodulated clock, and a converter coupled between the automated test equipment and the device under test to retime test data streams with an unmodulated clock.

Each of the foregoing converter, method, and systems, may be implemented individually or in combination, and may be implemented with one or more of the following features in any suitable combination: 1. the test module comprises a field programmable gate array (FPGA). 2. the converter includes a phase locked loop that supplies a clock signal to the serializer, the clock signal being frequency modulated in accordance with a modulation signal. 3. the modulation signal is periodic. 4. the phase locked loop is coupled to the memory to track a buffer fill level average over a window width equal to or greater than one period of the modulation signal. 5. the phase locked loop provides the spread spectrum clock with an average frequency based on the buffer fill level average. 6. the modulation signal has a triangular waveform with a period between 30 and 34 microseconds. 7. the clock signal has a nominal frequency of 32 GHz and a frequency deviation between 64 and 160 MHz (between 2000 and 5000 ppm). 8. the converter includes: a second deserializer to receive a second data stream with a spread spectrum clock; a second memory coupled to the second deserializer to buffer the second data stream; and a second serializer coupled to the memory to retransmit the data stream with an unmodulated clock. 9. The converter includes: a second phase locked loop that supplies the unmodulated clock to the second serializer, the unmodulated clock signal having a frequency based on an averaged buffer fill level of the second memory. 10. The device under test comprises a field programmable gate array (FPGA).

DETAILED DESCRIPTION

Figure 1A:
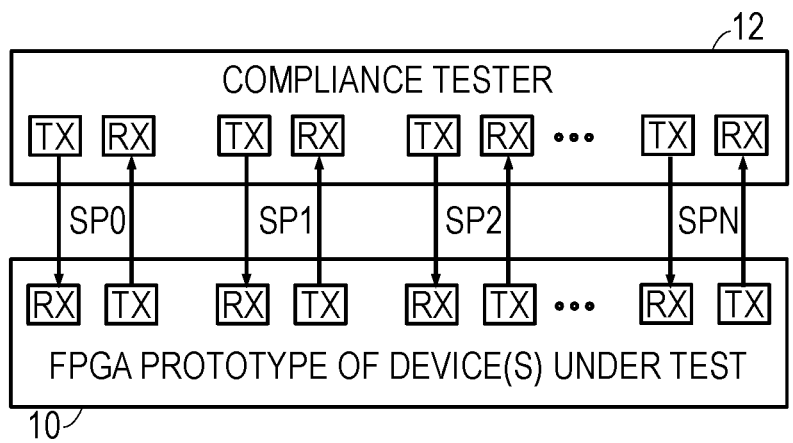
FIG. 1A is a block diagram of an illustrative FPGA-based prototype coupled to a compliance tester.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

Field-programmable gate arrays (FPGAs) are integrated circuits containing arrays of programmable logic blocks wired together by a hierarchy of reconfigurable interconnects. The programmable logic blocks can be configured to perform simple logic operations or complex combinatorial functions. The interconnects often include bidirectional data buses that can provide very fast I/O rates. FPGAs can be used to implement any function of an application specific integrated circuit (ASIC), with the added benefit of being able to update their functionality after shipping. Many FPGAs include (or can be configured to implement) processor cores, which may implement the functions of programmable controllers. Their flexibility makes them desirable for high-speed automated testing, both as prototypes and as the basis for automated test equipment (ATE) architecture.

FIG. 1A shows an illustrative FPGA-based prototype device under test (DUT) 10 coupled to a compliance tester 12 via one or serial ports SP0-SPN corresponding to bidirectional lanes of a high speed communications link. To perform system level verification of DUT 10, compliance tester 12 transmits test data streams to the DUT 10 and obtains the result data streams from the DUT. Compliance tester 12 analyzes the result data streams, typically by comparing them to expected results, to verify proper system-level operation of the DUT 10.

It should be noted that the reconfigurable interconnect designs implemented within FPGAs necessarily impose certain timing limits on the internal logic, which may prevent the DUT 10 from supporting modulated clocks at frequencies above 10 GHz, making it difficult for compliance testers using spread spectrum clocking (SSC) to perform proper testing of DUT prototypes.

Figure 1B:
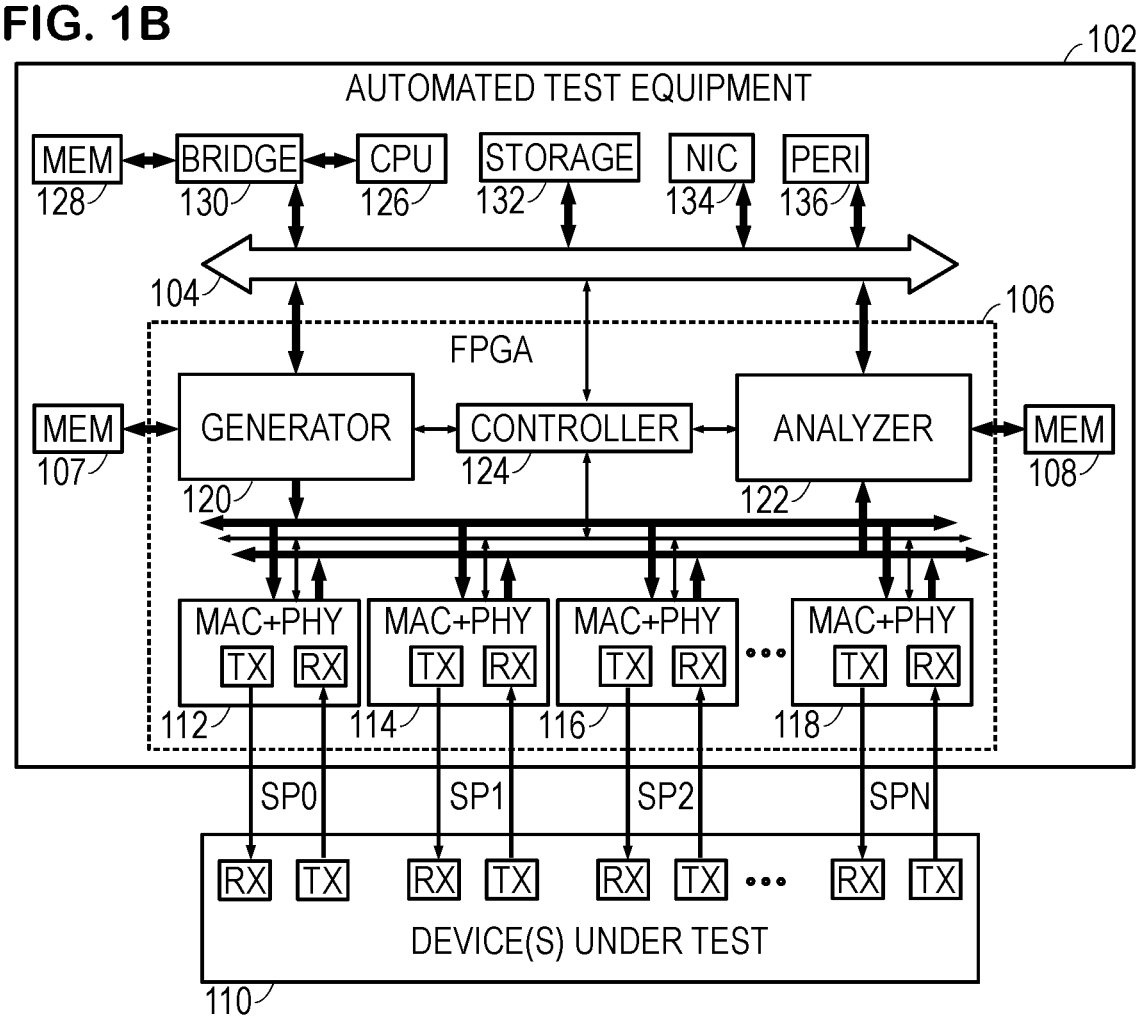
FIG. 1B is a block diagram of illustrative FPGA-based automated test equipment (ATE).

FPGAs can also appear within automated tester equipment (ATE). FIG. 1B shows an illustrative FPGA-based ATE system 102, having an internal communications bus or backplane 104 coupled to one or more FPGA daughter cards, each having an FPGA chip 106 with internal or external memory modules 107-108. On each daughter card, the FPGA chip 106 couples to one or more device(s) under test (DUT) 110 via one or serial ports SP0-SPN corresponding to bidirectional lanes of a high speed communications link. Each serial port SP0-SPN couples to a corresponding serializer-deserializer (SerDes) module 112-118 implemented by the FPGA chip 106.

For compliance with the ISO/IEC Model for Open Systems Interconnection (See ISO/IEC 7498-1:1994.1), the SerDes modules 112-118 may implement the Physical Layer (PHY) and a Media Access Control (MAC) Sublayer (to define the interface with the Physical Layer, including a frame structure and transfer syntax). The Physical layer provides the mechanical, electrical, functional, and procedural means to activate, maintain, and deactivate channels, and to use the channels for transmission of bits across the physical media. The Physical Layer implementation depends on the precise standard (e.g., Ethernet, USB, PCIE), but typically includes subdivisions for coding, error correction, and conversion between digital and analog representation.

FPGA chip 106 further includes a test data stream generator 120, a result data stream analyzer 122, and a controller 124. To perform system level verification of DUT 110, FPGA 106 passes test data streams from generator 120 to the SerDes modules 112-118, which transmit the data streams to the DUT 110 and obtain the result data streams from the DUT. The SerDes modules pass the result data streams to the analyzer 122. Coordinated by controller 124, the generator 120 and analyzer 122 operate to verify proper system-level operation of the DUT functions.

The controller 124 reports evaluation results (or summary statistics thereof) to the host processor(s) 126 of the ATE system 102. A bus bridge 130 couples the host processor(s) 126 to the backplane 104 and to system memory 128, which the host processor uses to retrieve and store software from nonvolatile storage 132. When executed, the software configures the host processor to retrieve specifications for the type of DUT, to appropriately configure operation of the daughter cards, and to monitor progress of the testing process. The host processor may interact with system users via a network interface card 134 or via local peripherals 136 such as a touchscreen and keyboard.

We note again that the reconfigurable interconnect designs implemented within FPGAs necessarily impose certain timing limits on the interconnected modules, including SerDes modules 112-118. These timing limits prevent the SerDes modules 112-118 from supporting modulated clocks at frequencies above 10 GHz, making it difficult for proper testing of DUTs using spread spectrum clocking (SSC).

The present disclosure provides for the use of SSC converters to bridge communications between SSC domains and devices such as FPGAs operating in unmodulated clock domains. The SSC converters may not only remove clock modulation for data streams exiting a SSC domain, but may further provide data streams exiting an unmodulated clock domain with SSC modulation.

Figure 2A:
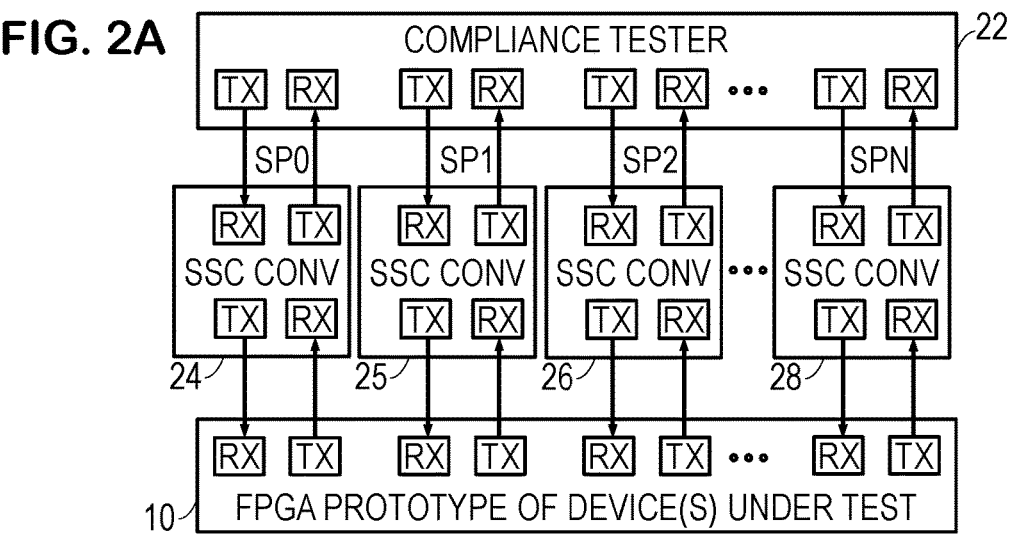
FIG. 2A is a block diagram of an illustrative compliance tester with SSC coupled to an FPGA-based prototype via SSC converters.

Accordingly, FIG. 2A shows an illustrative FPGA-based prototype device under test (DUT) 10 coupled to a compliance tester 22 that employs SSC. Each of the compliance tester's serial ports SP0-SPN is coupled to an SSC converter 24-28, which in turn is coupled to the DUT ports. The SSC converters 24-28 each enable data stream transfers between a modulated clock domain (compliance tester 22) and an unmodulated clock domain (the FPGA 10).

Figure 2B:
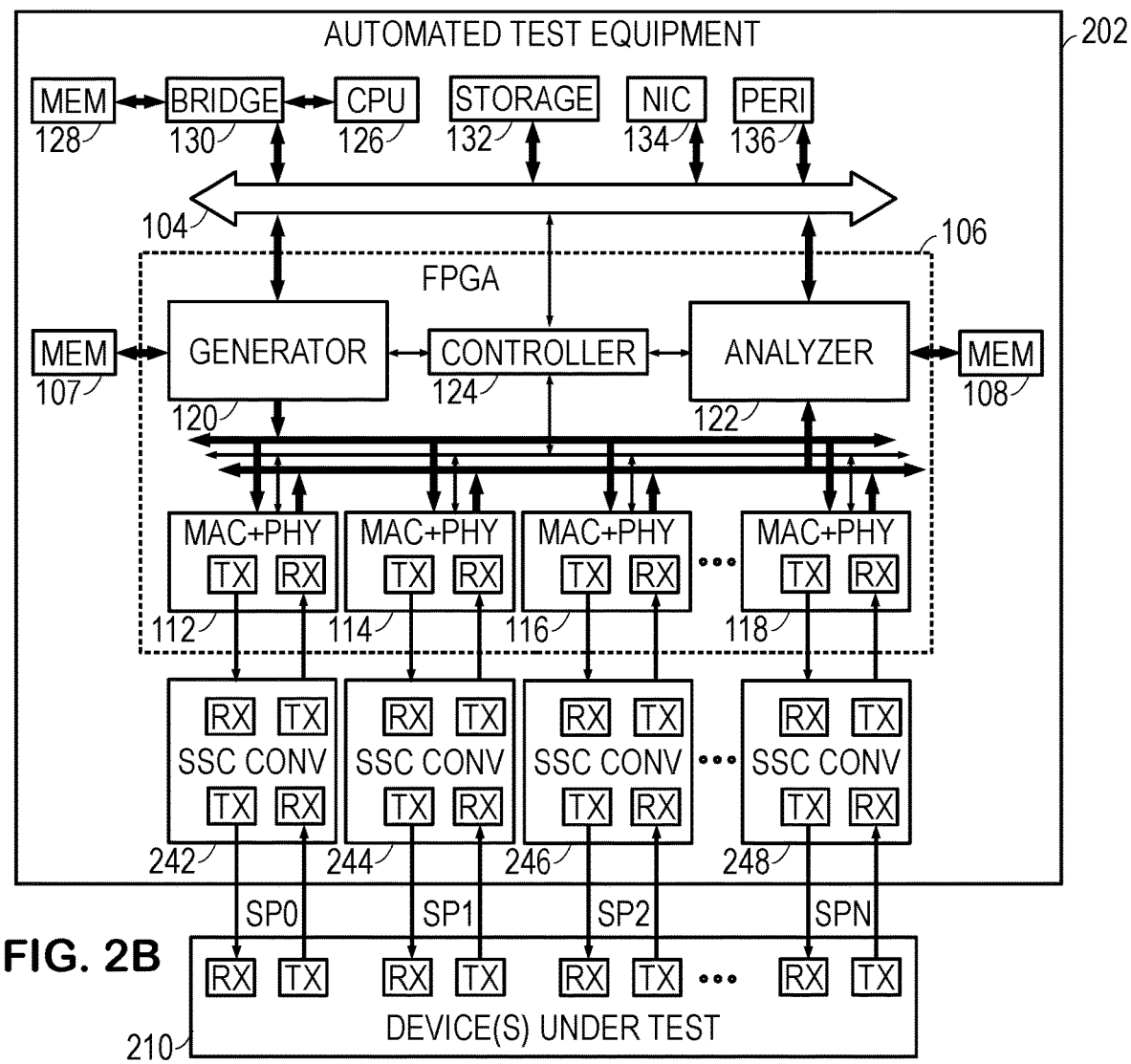
FIG. 2B is a block diagram of illustrative FPGA-based ATE for devices with SSC.

In a related fashion, FIG. 2B shows an illustrative ATE system 202 configured for verifying DUTs 210 using SSC. In system 202, each serial port SP0-SPN is provided with an SSC converter 242-248 to enable data stream transfers between a modulated clock domain (the DUTs 210) and an unmodulated clock domain (the FPGA 106). Among other things, the SSC converters may actively introduce SSC to data streams being transmitted to the modulated clock domain. The SSC converters may be monolithic integrated circuits, though in at least some contemplated implementations a single IC chip may provide multiple SSC converters. Alternatively, the FPGA chips may be updated to incorporate SSC conversion modules.

Figure 3:
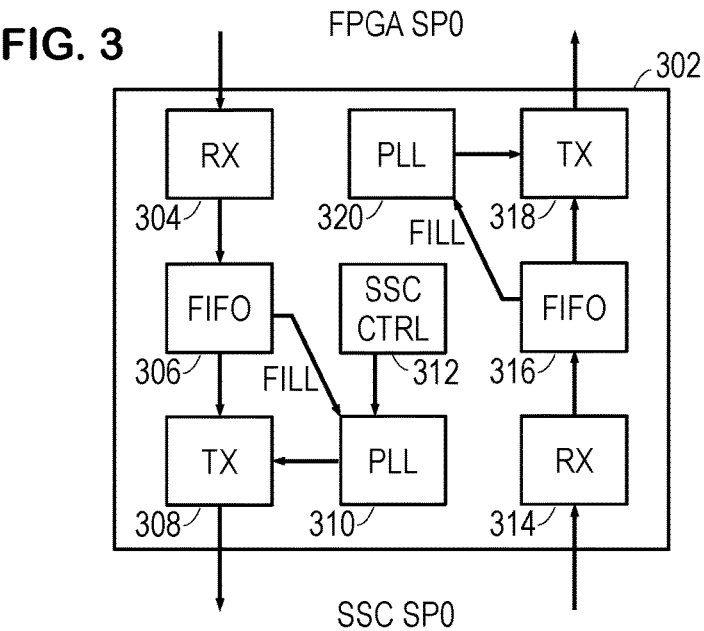
FIG. 3 is a block diagram of an illustrative SSC converter.

FIG. 3 shows an illustrative SSC converter 302 which includes a receiver 304 to receive a data stream from an unmodulated clock domain, a first-in first-out (FIFO) memory buffer 306 to buffer the data stream, and a transmitter 308 to send the data stream to a modulated clock domain. A phase-locked loop (PLL) 310 provides a modulated clock signal for the transmitter 308 to use when sending the data stream.

PLL 310 may include a phase comparator that compares a reference clock signal to a feedback clock signal to derive a phase error signal. A filter converts the phase error signal into a control signal for a voltage controlled oscillator, which generates the output clock signal for transmitter 308. A feedback path derives the feedback clock signal from the output clock signal, typically using a programmable frequency divider.

The frequency divider modulus may be controlled in accordance with a modulation signal from a SSC controller 312. The modulation signal can be any periodic signal, but typically it has an approximately sinusoidal or triangular waveform with an amplitude and period that provide the desired SSC parameters. Contemplated parameters include a nominal clock frequency of 20 to 40 GHz, a modulation frequency around 20 to 40 kHz, and frequency deviation in the range of 2000 to 5000 ppm. An averaged buffer fill level (averaged over at least once cycle of the modulation signal) may be used to offset the modulation signal so as to provide an average clock frequency that maintains the fill level of the buffer around a desired value (e.g., 50%).

Alternatively, or in addition, to basing the frequency divider modulus on the modulation signal and averaged buffer fill level, the modulation can be perform using the control signal. That is, the control signal may be based not only on the filtered phase error signal, but also on modulation signal and averaged buffer fill level. Other PLL configurations may also be suitable, e.g., using the averaged buffer fill level to control the frequency divider modulus while combining the modulation signal with the filtered phase error signal.

The illustrative SSC converter 302 further includes a receiver 314 to receive a data stream from the modulated clock domain, a second FIFO memory buffer 316 to buffer the data stream, and a transmitter 318 to send the data stream to the unmodulated clock domain. A second PLL 320 provides a nominally-fixed frequency clock signal for the transmitter 318 to use when sending the data stream.

PLL 320 may operate similarly to PLL 310, albeit without a modulation signal. The frequency of the clock signal is set to maintain the averaged buffer fill level. (The buffer fill level is averaged over at least one clock modulation cycle of the data stream received from the modulated clock domain.)

Figure 4:
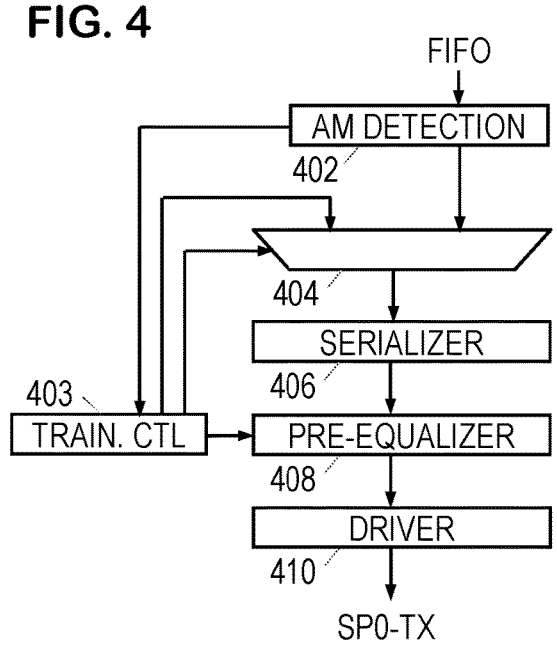
FIG. 4 is a block diagram of an illustrative transmit chain.
Figure 5:
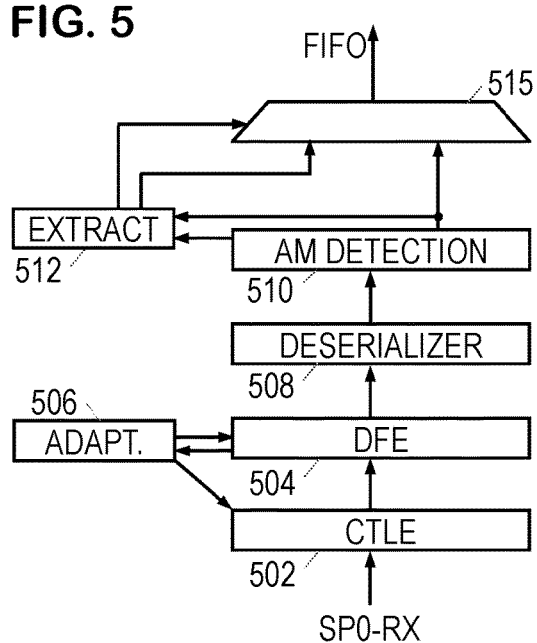
FIG. 5 is a block diagram of an illustrative receive chain.

FIGS. 4 and 5 provide more detailed block diagrams of an illustrative transmitter and receiver. The transmit chain in FIG. 4 retrieves the buffered data stream from memory 306, scanning the data stream for alignment markers (AM) in AM detection module 402. When the alignment markers are detected during normal operations, a training control module 403 may control a multiplexer 404 to selectively provide modified alignment markers containing backchannel training information, e.g., as described in U.S. Pat. No. 10,212,260 "SerDes architecture with a hidden backchannel protocol".

During auto-negotiation and training phases, the training control module 403 may use the multiplexer 404 to supply negotiation and training data streams to the serializer 406. During normal operations and in the absence of modified alignment markers, the multiplexer 404 forwards the buffered data stream to the serializer 406. The serializer 406 accepts the stream of transmit data blocks and converts the stream of blocks into a (higher-rate) stream of channel symbols. Where, for example, a 4-PAM signal constellation is used, each serializer may produce a stream of two-bit symbols. For NRZ signal constellations, each symbol is represented with one bit.

The stream of channel symbols is filtered by a pre-equalizer module 408 to produce a transmit signal, which is amplified and supplied to the transmit channel by a driver 410. The pre-equalizer module 408 compensates for at least some of the channel dispersion, reducing or eliminating the need for receiver-side equalization. Such pre-equalization may be advantageous in that it avoids the noise enhancement often associated with receiver-side equalization and enables digital filtering with a reduced bit-width.

The training controller 403, in cooperation with the training controller on the remote end of the channel, operates to characterize the channel after conducting an initial auto-negotiation phase. During the auto-negotiation phase, the training controller 403 generates a sequence of auto-negotiation frames conveying capabilities of the local node to the remote node and negotiates to select a combination of features to be used for subsequent communications. When the auto-negotiation phase is complete, the training controller 403 generates a sequence of training frames.

During the training process, the training controller 403 receives backchannel information from the remote end of the channel via the receiver (FIG. 5) and uses the backchannel information to adjust the coefficients of the pre-equalization filter 408. The controller 403 further receives locally-generated information for adapting the coefficients of the pre-equalization filter in the remote node. Based on this locally-generated information, the controller 403 populates the relevant fields of the training frames to provide backchannel information to the remote node. As training frames are employed only during the training phase, and as it may be desirable to continue updating the pre-equalization filter during normal operations, the training controller 403 may include similar backchannel information in or with the modified alignment markers during normal operations.

FIG. 5 shows a receive chain obtaining analog electrical signals from the channel. A continuous time linear equalizer (CTLE) 502 filters the analog signals to shape the spectrum of the receive signal in an adaptive fashion. A decision feedback equalizer (DFE) 502 operates on the filtered signals to correct for ISI and detect each transmitted channel bit or symbol, thereby producing a demodulated digital data stream. A clock recovery and adaptation module 506 derives a sampling clock signal from the input and/or output of the DFE's decision element and supplies it back to the DFE to control timing of the symbol detection. The adaptation module 506 further derives an error signal of the DFE decision element's input relative to the output or (during the training phase) relative to a known training pattern, and uses the error signal to adapt the DFE coefficient(s) and the response of the CTLE filter 502. The adaptation module still further uses the error signal to locally generate adaptation information for the pre-equalizer at the remote end of the channel. The adaption module supplies this adaptation information the training controller 403 (FIG. 4).

A deserializer 508 groups the digital receive data stream bits or symbols into blocks to enable the use of lower clock rates for subsequent on-chip operations. Alignment marker detection module 510 monitors the receive data stream to detect the alignment markers and achieve alignment marker lock during normal operations, or during training operations to detect the training frame markers and achieve lock thereto. The backchannel information extraction module 512 extracts the backchannel information from the appropriate portions of the training frames and alignment markers, providing the pre-equalizer adaptation information and status report information to the training controller(s) 403. During normal operations, the multiplexer 515, operating under control of the extraction module 512, replaces the modified alignment markers with standardized alignment markers, thereby hiding the backchannel information fields from the higher layers. The received data stream is supplied to the FIFO buffer 316.

Figure 6:
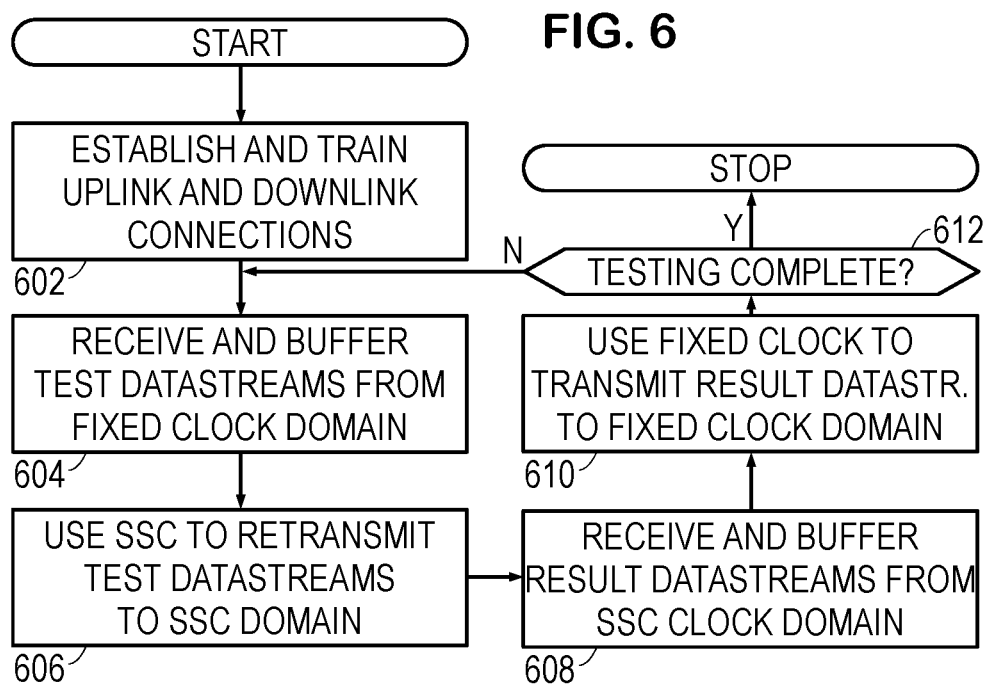
FIG. 6 is a flow diagram of an illustrative SSC conversion method.

FIG. 6 shows an illustrative SSC conversion method that may be implemented by the SSC converter of FIG. 3. It begins in block 602 with the SSC converter negotiating and training an uplink connection to the FPGA chip and a downlink connection to the DUT. The uplink and downlink connections can be established concurrently. In block 604 the SSC converter receives and buffers a test data stream from the FPGA (i.e., the unmodulated clock domain). In block 606, the SSC converter retransmits the test data stream to the DUT, using a modulated clock to provide the test data stream with SSC. In block 608, the SSC converter receives and buffers a result data stream from the DUT (i.e., the modulated clock domain). In block 610, the SSC converter retransmits the result data stream to the FPGA, using an unmodulated clock. In block 612, the SSC converter determines whether any of the connections have been terminated, and if not, repeats blocks 604-610 until testing is complete.

Though the conversion method is shown as a sequence of blocks for explanatory purposes, in practice the converter is expected to implement the various operations concurrently. Numerous other alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. A converter that comprises:
   a deserializer to receive a data stream with an unmodulated clock;
   a memory coupled to the deserializer to buffer the data stream;
   a serializer coupled to the memory to retransmit the data stream with a spread spectrum clock; and
   a phase locked loop that supplies a clock signal to the serializer, the clock signal being frequency modulated in accordance with a modulation signal that is periodic,
   wherein the phase locked loop is coupled to the memory to track a buffer fill level average over a window width equal to or greater than one period of the modulation signal, and
   wherein the phase locked loop provides the spread spectrum clock with an average frequency based on the buffer fill level average.

2. The converter of claim 1, wherein the modulation signal has a triangular waveform with a period between 30 and 34 microseconds.

3. The converter of claim 2, wherein the clock signal has a nominal frequency of 32 GHz and a frequency deviation between 64 and 160 MHz (between 2000 and 5000 ppm).

4. A converter that comprises:
   a deserializer to receive a data stream with an unmodulated clock;
   a memory coupled to the deserializer to buffer the data stream;
   a serializer coupled to the memory to retransmit the data stream with a spread spectrum clock;
   a phase locked loop that supplies a clock signal to the serializer, the clock signal being frequency modulated in accordance with a modulation signal;
   a second deserializer to receive a second data stream with a spread spectrum clock;
   a second memory coupled to the second deserializer to buffer the second data stream; and
   a second serializer coupled to the memory to retransmit the data stream with an unmodulated clock.

5. The converter of claim 4, further comprising a second phase locked loop that supplies the unmodulated clock to the second serializer, the unmodulated clock signal having a frequency based on an averaged buffer fill level of the second memory.

6. A conversion method that comprises, in a monolithic integrated circuit:
   receiving a data stream from an external transmitter in an unmodulated clock domain;
   storing the data stream in a buffer;
   retransmitting the data stream using a spread spectrum clock;
   receiving a second data stream with spread spectrum clocking;
   storing the second data stream in a second buffer; and
   retransmitting the second data stream with an unmodulated clock.

7. The method of claim 6, wherein the retransmitting includes using a modulation signal to modulate a frequency of the spread spectrum clock relative to an average frequency.

8. The method of claim 7, further comprising:
   determining a buffer fill level average over a window width of at least one period of the modulation signal; and
   setting the average frequency based on the buffer fill level average.

9. The method of claim 8, wherein the modulation signal has a triangular waveform with a period between 30 and 34 microseconds.

10. The method of claim 9, wherein the spread spectrum clock has a nominal frequency of 32 GHz and a frequency deviation between 64 and 160 MHz (between 2000 and 5000 ppm).

11. A system that comprises:
    a test module to generate test data streams and to analyze result data streams for verifying operation of one or more devices under test in a spread spectrum clock domain, the test module operating in an unmodulated clock domain; and
    a converter coupled to the test module to retime the test data streams with a spread spectrum clock and to retime the result data streams with an unmodulated clock, the converter comprising:
      a receiver to receive a data stream with an unmodulated clock;
      a memory coupled to the receiver to buffer the data stream;
      a transmitter coupled to the memory to retransmit the data stream using a spread spectrum clock;
      a second receiver to receive a second data stream with a spread spectrum clock;
      a second memory coupled to the second receiver to buffer the second data stream; and
      a second transmitter coupled to the memory to retransmit the data stream with an unmodulated clock.

12. The system of claim 11, wherein the test module comprises a field programmable gate array (FPGA).

13. The system of claim 11, wherein the converter further comprises a phase locked loop that supplies a clock signal to the transmitter, the clock signal being frequency modulated in accordance with a modulation signal.

14. The system of claim 13, wherein the modulation signal is periodic, wherein the phase locked loop is coupled to the memory to track a buffer fill level average over a window width equal to or greater than one period of the modulation signal, and wherein the phase locked loop provides the spread spectrum clock with an average frequency based on the buffer fill level average.

15. The system of claim 14, wherein the modulation signal has a triangular waveform with a period between 30 and 34 microseconds.

16. The system of claim 15, wherein the clock signal has a nominal frequency of 32 GHz and a frequency deviation between 64 and 160 MHz (between 2000 and 5000 ppm).

17. The system of claim 14, further comprising a second phase locked loop that supplies the unmodulated clock to the second serializer, the unmodulated clock signal having a frequency based on an averaged buffer fill level of the second memory.

\* \* \* \* \*